United States Patent
Yu et al.

(10) Patent No.: US 11,345,610 B2
(45) Date of Patent: May 31, 2022

(54) APPARATUS FOR ARTIFICIAL INTELLIGENCE CONTROLLING WATER PURIFIER, ARTIFICIAL INTELLIGENCE WATER PURIFIER AND METHOD FOR CONTROLLING THEREOF

(71) Applicant: LG ELECTRONICS INC., Seoul (KR)

(72) Inventors: Kiwon Yu, Seoul (KR); Jongho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 817 days.

(21) Appl. No.: 15/712,784

(22) Filed: Sep. 22, 2017

(65) Prior Publication Data

US 2018/0105436 A1 Apr. 19, 2018

(30) Foreign Application Priority Data

Oct. 17, 2016 (KR) .................. 10-2016-0134397

(51) Int. Cl.
  *C02F 1/00* (2006.01)
  *A47J 31/00* (2006.01)
  *A47J 31/60* (2006.01)

(52) U.S. Cl.
  CPC .............. *C02F 1/008* (2013.01); *A47J 31/00* (2013.01); *A47J 31/605* (2013.01); *C02F 2209/40* (2013.01); *C02F 2209/44* (2013.01); *C02F 2307/10* (2013.01)

(58) Field of Classification Search
  CPC ........ C02F 1/00; C02F 1/008; C02F 2209/40; C02F 2209/44; C02F 2209/00; C02F 2307/10; C02F 1/001; A47J 31/00; A47J 31/605; B01D 37/04; B01D 37/043; B01D 37/048

USPC .......................................................... 210/138
See application file for complete search history.

(56) References Cited

U.S. PATENT DOCUMENTS

| 4,957,624 | A | 9/1990 | Peranio |
| 5,536,395 | A * | 7/1996 | Kuennen ................. C02F 1/283 210/87 |
| 5,589,068 | A | 12/1996 | Nielsen |
| 6,182,453 | B1 * | 2/2001 | Forsberg ............. B01D 5/0072 62/125 |
| 7,862,728 | B2 | 1/2011 | Yencho |

(Continued)

FOREIGN PATENT DOCUMENTS

CN  103382059  11/2013

OTHER PUBLICATIONS

Indian Office Action in Indian Application No. 201714033235, dated Jul. 16, 2019, 6 pages (with English translation).

*Primary Examiner* — Akash K Varma
(74) *Attorney, Agent, or Firm* — Fish & Richardson P.C.

(57) ABSTRACT

A control apparatus for an artificial intelligence water purifier includes a storage device and a control unit. The storage device is configured to store discharge information that includes an amount of beverage discharged from the water purifier in a time slot of a predetermined period of time. The control unit is configured to analyze the discharge information, set the time slot in a power-saving schedule based on analysis of the discharge information, and control the water purifier to perform a power-saving operation based on determining that an operation time is within the time slot set in the power-saving schedule.

15 Claims, 5 Drawing Sheets

(56) References Cited

U.S. PATENT DOCUMENTS

| | | | | |
|---|---|---|---|---|
| 2008/0314807 | A1* | 12/2008 | Junghanns | B01D 61/12 |
| | | | | 210/85 |
| 2009/0084734 | A1* | 4/2009 | Yencho | C02F 1/325 |
| | | | | 210/741 |
| 2010/0191487 | A1* | 7/2010 | Rada | G05F 1/70 |
| | | | | 702/60 |
| 2011/0147194 | A1* | 6/2011 | Kamen | B01D 5/006 |
| | | | | 202/185.1 |
| 2012/0318723 | A1* | 12/2012 | Guess | C02F 1/001 |
| | | | | 210/85 |
| 2014/0216071 | A1* | 8/2014 | Broadbent | H04L 12/2809 |
| | | | | 62/66 |
| 2014/0374327 | A1* | 12/2014 | Langdo | C02F 1/00 |
| | | | | 210/85 |
| 2016/0175785 | A1* | 6/2016 | Li | A47J 31/00 |
| | | | | 366/163.2 |

* cited by examiner

FIG. 4

| TIME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| FIRST DAY | 0 | 0 | 0 | 0 | 0 | 0 | $t_0$ | $t_1$ | 0 | 0 | 0 | $t_2$ | $t_3$ | 0 | 0 | 0 | 0 | 0 | 0 | 0 | $t_4$ | 0 | 0 | 0 |
| SECOND DAY | 0 | 0 | 0 | 0 | 0 | 0 | $t_5$ | $t_6$ | 0 | 0 | 0 | 0 | $t_7$ | $t_8$ | 0 | 0 | 0 | 0 | 0 | $t_9$ | $t_{10}$ | $t_{11}$ | 0 | 0 |
| THIRD DAY | $t_{12}$ | 0 | 0 | 0 | 0 | 0 | $t_{13}$ | $t_{14}$ | 0 | 0 | 0 | $t_{15}$ | $t_{16}$ | 0 | 0 | 0 | 0 | 0 | 0 | $t_{17}$ | $t_{18}$ | 0 | 0 | 0 |
| FOURTH DAY | 0 | 0 | 0 | 0 | 0 | 0 | $t_{19}$ | $t_{20}$ | 0 | 0 | 0 | $t_{21}$ | $t_{22}$ | 0 | 0 | 0 | 0 | 0 | 0 | $t_{23}$ | $t_{24}$ | 0 | $t_{25}$ | 0 |
| FIFTH DAY | 0 | 0 | 0 | 0 | 0 | 0 | $t_{26}$ | 0 | 0 | 0 | 0 | $t_{27}$ | 0 | 0 | 0 | 0 | 0 | 0 | 0 | 0 | 0 | $t_{29}$ | 0 | $t_{30}$ |
| SIXTH DAY | $t_{31}$ | 0 | 0 | $t_{32}$ | 0 | 0 | 0 | 0 | 0 | $t_{33}$ | $t_{34}$ | $t_{35}$ | 0 | 0 | $t_{36}$ | $t_{37}$ | 0 | 0 | 0 | 0 | 0 | 0 | $t_{38}$ | $t_{39}$ |
| SEVENTH DAY | 0 | $t_{40}$ | 0 | 0 | 0 | 0 | 0 | 0 | 0 | 0 | $t_{41}$ | $t_{42}$ | 0 | 0 | 0 | 0 | 0 | $t_{44}$ | $t_{45}$ | 0 | $t_{46}$ | 0 | 0 | 0 |
| ... | | | | | | | | | | | | | | | | | | | | | | | | |

FIG. 5

| TIME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| FIRST WEEK | 1 | 0 | 0 | 0 | 0 | 0 | 1 | 0 | 0 | 0 | 0 | 0 | 0 | 0 | 0 | 0 | 0 | 0 | 0 | 0 | 1 | 0 | 0 | 1 |
| SECOND WEEK | 0 | 0 | 0 | 0 | 0 | 0 | 1 | 1 | 1 | 0 | 0 | 0 | 0 | 0 | 0 | 0 | 0 | 0 | 0 | 1 | 1 | 1 | 0 | 1 |
| THIRD WEEK | 1 | 0 | 0 | 0 | 0 | 0 | 1 | 1 | 0 | 0 | 0 | 0 | 0 | 0 | 0 | 0 | 0 | 0 | 0 | 1 | 1 | 0 | 0 | 1 |
| OPERATION | N | P | P | P | P | P | N | N | P | P | P | P | P | P | P | P | P | P | P | N | N | P | P | N |

N : NORMAL
P : POWER-SAVING

| NUMBER OF GLASSES | NORMAL OPERATION (1.2~2.2[ °C]) | | POWER-SAVING OPERATION (1.2~4.2[ °C]) | |
|---|---|---|---|---|
| | OFF → ON | ON → OFF | OFF → ON | ON → OFF |
| 1 | 5.1 | 4.8 | 6.8 | 4.5 |
| 2 | 5.3 | 4.6 | 6.5 | 4.5 |
| 3 | 6.5 | 5.9 | 7.7 | 5.7 |
| 4 | 7.8 | 7.1 | 8.7 | 6.8 |
| 5 | 8.8 | 8.1 | 9.5 | 7.8 |
| 6 | 9.7 | 9.0 | 10.5 | 8.8 |
| 7 | 10.4 | 10.0 | 11.2 | 9.6 |
| 8 | 11.3 | 10.8 | 11.9 | 10.4 |
| 9 | 12.1 | 11.7 | 12.7 | 11.1 |
| 10 | 12.8 | 12.4 | 13.3 | 11.9 |

APPARATUS FOR ARTIFICIAL INTELLIGENCE CONTROLLING WATER PURIFIER, ARTIFICIAL INTELLIGENCE WATER PURIFIER AND METHOD FOR CONTROLLING THEREOF

CROSS-REFERENCE TO RELATED APPLICATION

Pursuant to 35 U.S.C. § 119(a), this application claims the benefit of an earlier filing date of and the right of priority to Korean Application No. 10-2016-0134397, filed on Oct. 17, 2016, the contents of which are incorporated by reference herein in its entirety.

FIELD

The present disclosure relates to a water purifier, a control apparatus for the water purifier, and a control method for the water purifier, and more particularly, to a control apparatus associated with a power-saving operation of a tankless water purifier.

BACKGROUND

A water purifier, which can supply cold water or hot water to a user, may include many components for supplying cold water or hot water. Example components for supplying cold water may include a compressor that can cool flow of water introduced into the water purifier to lower a temperature of water, a filter, and a valve, while example components for supplying hot water may include a hot water tank that can store the introduced flow, a heating device that can heat the hot water tank to heat water stored in the hot water tank, and a control device that can control the heating device. These components may constantly consume electric power because the water purifier may be always in operation, which may lead to power consumption during the use of the water purifier.

In some cases for controlling the water purifier, a power-saving operation is performed according to a usage pattern of the water purifier to reduce power consumption of the water purifier. For this purpose, in order to control the operation of the water purifier, a discharge pattern of the beverage discharged from the water purifier is determined, and a power-saving schedule for the power-saving operation is set based on the discharge pattern.

However, there may be the following limits.

In some examples, the usage pattern may be determined only based on use or non-use of the water purifier, which may make it difficult to precisely apply the usage pattern to the power-saving operation. In some related art, even when only a glass of water is discharged, it may be determined that the water purifier is used, a power-saving schedule is set, and a power-saving operation is performed based on such determination. In this case, the power-saving operation may not be performed based on precise analysis and application of the usage pattern.

In some examples, the operation may not be appropriately performed based on usage variation of the user. Analysis and application of the usage pattern may be performed without considering usage variation of the user, which may make it difficult to perform the operation based on the usage variation of the user. For instance, water may be discharged from the water purifier during the power-saving operation above the criteria of the power-saving operation, or water may be discharged from the water purifier during the normal operation below the criteria of the normal operation.

In some examples, power consumption may not be adequately and efficiently reduced. In some cases, there are no appropriate control standards or methods for reducing power consumption. It may be difficult to appropriately perform the power-saving operation and power consumption may not be adequately and efficiently reduced based on usability for the user.

In some cases, a user may not be satisfied with water discharged in power-saving operations, which may lead to low usability and decrease a utility rate of the water purifier.

As a result, there is a need for controlling a water purifier that can adequately and efficiently perform a power-saving operation to satisfy the need of the user and to reduce power consumption.

SUMMARY

Therefore, in efforts to solve the foregoing problems of the related art, it is an object of the present disclosure to provide a control apparatus for a water purifier, the water purifier, and a control method for the water purifier, which can perform the power-saving operation based on the precisely-analyzed usage pattern of the user.

The present disclosure may provide a control apparatus for a water purifier, the water purifier, and a control method for the water purifier, which can adequately and efficiently perform the power-saving operation.

The present disclosure may provide a control apparatus for a water purifier, the water purifier, and a control method for the water purifier, which can perform the operation based on the usage pattern or needs of the user, while improving power-saving efficiency.

The control apparatus for the water purifier, the water purifier, and the control method for the water purifier to achieve the aforementioned objects store discharge information for a certain period of time, set a power-saving schedule based on the analysis result of the discharge information, and control the operation of the water purifier based on the power-saving schedule.

According to one aspect of the subject matter described in this application, a control apparatus for a water purifier includes a storage device configured to store discharge information that includes an amount of beverage discharged from the water purifier in a time slot of a predetermined period of time, and a control unit configured to analyze the discharge information, based on analysis of the discharge information, set the time slot in a power-saving schedule, and based on determining that an operation time is within the time slot set in the power-saving schedule, control the water purifier to perform a power-saving operation.

Implementations according to this aspect may include one or more of following features. For example, the discharge information may further include the amount of beverage discharged from the water purifier in the time slot on same days of two or more weeks of the predetermined period of time. The control unit may be further configured to determine a usage pattern by the time slot, based on the discharge information, and set the time slot of the same days in the power-saving schedule based on the usage pattern.

In some implementations, the control unit may be further configured to compare the amount of beverage discharged in the time slot with a threshold discharge amount, determine that the amount of beverage discharged in the time slot is greater than or equal to the threshold discharge amount, determine the time slot as a normal use time slot based on determining that the amount of beverage discharged in the time slot is greater than or equal to the threshold discharge amount, count the normal use time slot in the predetermined period of time, set the time slot to a normal operation time slot in the usage pattern based on a number of normal use time slots being two or more, and set the time slot to a power-saving operation time slot in the usage pattern based on the number of normal use time slots being less than two.

In some implementations, the control unit may be further configured to, based on the water purifier performing the power-saving operation, control the water purifier to discharge beverage based on preset discharge criteria. In some examples, the preset discharge criteria may include a preset discharge amount of beverage, and the control unit may be further configured to, based on the water purifier performing the power-saving operation, control the water purifier to discharge the beverage to the preset discharge amount. In some examples, the preset discharge criteria include a preset discharge temperature, and the control unit may be further configured to, based on the water purifier performing the power-saving operation, control the water purifier to discharge the beverage at a temperature less than the preset discharge temperature.

In some implementations, the preset discharge criteria may include a preset discharge amount of beverage and a preset discharge temperature, and the control unit may be further configured to, based on the water purifier performing the power-saving operation, control the water purifier to discharge the beverage to the preset discharge amount at a temperature less than the preset discharge temperature. In some examples, the water purifier includes a discharge temperature regulator that is configured to regulate a temperature of the beverage, and the control unit may be further configured to, based on the water purifier performing the power-saving operation, control the water purifier by regulating a temperature control range of the discharge temperature regulator.

In some implementations, the discharge temperature regulator may include a cooling device that is configured to regulate a temperature of cold water that is to be discharged from the water purifier, and the control unit may be further configured, based on the water purifier performing the power-saving operation, to increase an upper limit of a temperature control range of the cooling device. In some examples, the cooling device may include cooling unit including coolant and being configured to cool the cold water, and a compressor configured to control a temperature of the coolant. The temperature control range of the cooling device is a temperature range of the coolant.

In some implementations, the control unit may be further configured, based on the time slot having been set to the power-saving operation, to determine that the time slot is followed by a second time slot that is set to a normal operation, and based on determining that the time slot is followed by the second time slot that is set to the normal operation, to control the water purifier to switch from the power-saving operation to the normal operation at a preset time before the second time slot.

In some examples, the control unit may be further configured, based on the water purifier performing the power-saving operation, to determine a number of times that the beverage has been discharged in the time slot, and based on the number of times exceeding a threshold number of times, to control the water purifier to switch the power-saving operation to a normal operation.

According to another aspect, a water purifier includes an inlet unit configured to receive clean water that has passed through a filter, an outlet unit configured to discharge cold or hot water generated from the clean water to an outside, a discharge temperature regulator configured to regulate a temperature of the cold or hot water, and a control apparatus. The control apparatus is configured to control the outlet unit and the discharge temperature regulator to control an operation of the water purifier, store discharge information that includes an amount of the cold or hot water discharged from the water purifier for a predetermined period of time, analyze the discharge information, based on analysis of the discharge information, set a power-saving schedule, and control the water purifier to perform a normal operation or a power-saving operation based on the power-saving schedule.

Implementations according to this aspect may include one or more of following features. For example, the power-saving operation may include at least one of a first operation in which the control apparatus controls the water purifier to discharge the cold or hot water based on preset discharge criteria or a second operation in which the control apparatus controls the discharge temperature regulator to regulate a temperature control range of the discharge temperature regulator. The preset discharge criteria may include a preset discharge amount of beverage, and the first operation may include an operation in which the control apparatus controls the water purifier to discharge the cold or hot water to the preset discharge amount.

In some examples, the preset discharge criteria may include a preset discharge temperature of beverage, and the first operation may include an operation in which the control apparatus controls the water purifier to discharge the cold or hot water at a temperature less than the preset discharge temperature. In some implementations, the preset discharge criteria may include a preset discharge amount of beverage and a preset discharge temperature of beverage, and the first operation includes an operation in which the control apparatus controls the water purifier to discharge the preset discharge amount of the cold or hot water at a temperature less than the preset discharge temperature.

In some examples, the discharge temperature regulator may include a cooling device that is configured to regulate a temperature of the cold water, and the second operation may include an operation in which the control apparatus increases an upper limit of a temperature control range of the cooling device. In some examples, the cooling device may include a cooling unit including coolant and configured to cool the cold water, and a compressor configured to control a temperature of the coolant. The temperature control range of the cooling device is a temperature range of the coolant.

According to another aspect, a control method for a water purifier, which includes a cooling device configured to regulate a temperature of beverage and that is configured to discharge the beverage, includes analyzing discharge information that includes an amount of the beverage discharged from the water purifier for a predetermined period of time, based on analysis of the discharge information, setting a power-saving schedule, and based on the power-saving schedule, controlling the water purifier to perform a normal operation or a power-saving operation. Controlling the water purifier to perform the power-saving operation includes at least one of controlling the water purifier to discharge the beverage based on preset discharge criteria or controlling the water purifier by increasing an upper limit of a temperature control range of the cooling device.

The control apparatus for the water purifier, the water purifier, and the control method for the water purifier analyze the discharge information for the certain period of time, set the power-saving schedule, and control the power-saving operation based on the power-saving schedule, which may make it possible to more precisely analyze and apply the usage pattern to perform the optimal power-saving operation.

In addition, the control apparatus for the water purifier, the water purifier, and the control method for the water purifier precisely analyze and apply the usage pattern to perform the power-saving operation, which may make it possible to maintain discharge performance or usability, while reducing power consumption in the power-saving operation, compared to the normal operation.

Moreover, the control apparatus for the water purifier, the water purifier, and the control method for the water purifier precisely regulate the temperature control range of the discharge temperature regulator in the power-saving operation, which may make it possible to appropriately reduce power consumption.

Furthermore, the control apparatus for the water purifier, the water purifier, and the control method for the water purifier can adequately and efficiently perform the operation of the water purifier, and at the same time, improve usability, utility and applicability of the technology for controlling the water purifier, in addition to the foregoing effects.

BRIEF DESCRIPTION OF DRAWINGS

The accompanying drawings, which are included to provide a further understanding of the disclosure and are incorporated in and constitute a part of this specification, illustrate exemplary implementations and together with the description serve to explain the principles of the disclosure.

FIG. 4 is a first view illustrating an example of discharge information by days.

FIG. 5 is a second view illustrating another example of discharge information by weeks.

DETAILED DESCRIPTION

Figure 1:
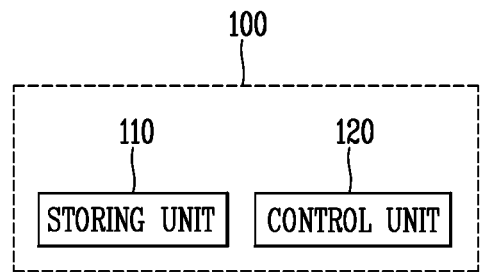
FIG. 1 is a block diagram illustrating a configuration of an example control apparatus for a water purifier.

Hereinafter, implementations of the present disclosure will be described in detail with reference to the accompanying drawings so that they can be readily implemented by those skilled in the art.

The technology can be applied to a control apparatus for a water purifier, the water purifier, and a control method for the water purifier. In particular, such technology can be usefully applied to a water purifier that performs the power-saving operation or to a control apparatus included in the water purifier.

However, the technology is not limited thereto, but can be variously applied to all kinds of water purifiers, control apparatuses included in the water purifiers, control methods for the water purifiers, operation methods, or operation control methods, to which the technical ideas of the technology can be applied, without being limited to specific uses.

It is to be noted that the technical terms as used herein are only to describe specific implementations and are not intended to limit the technical ideas of the technology. In addition, the technical terms as used herein should be construed as the meanings generally understood by those skilled in the art to which the present technology pertains, unless the context clearly dictates otherwise, and should not be construed in an overly broad sense or an overly narrow sense.

Moreover, if the technical terms as used herein are erroneous technical terms that do not accurately represent the technical ides of the technology, they should be construed as the technical terms that are well understood by those skilled in the art. Also, the generic terms as used herein should be construed as defined in the dictionaries or depending on the context and should not be construed in an overly narrow sense.

Further, the singular forms as used herein include plural forms, unless the context clearly dictates otherwise. In this disclosure, the terms "comprises" or "includes" and the like should not be construed as necessarily including all the components or steps and could be construed as not including some components or steps or as further including additional components or steps.

Hereinafter, implementations will be described in detail with reference to the accompanying drawings, same reference numerals will refer to same or similar components throughout the drawings, and a detailed description thereof will be omitted.

Furthermore, with respect to the technology, the related well-known arts will not be described in detail if they unnecessarily obscure the subject matter of the present technology. Also, it is to be noted that the accompanying drawings are given only for a better understanding of the technical ideas of the technology and should not be construed as limiting such technical ideas.

Figure 2:
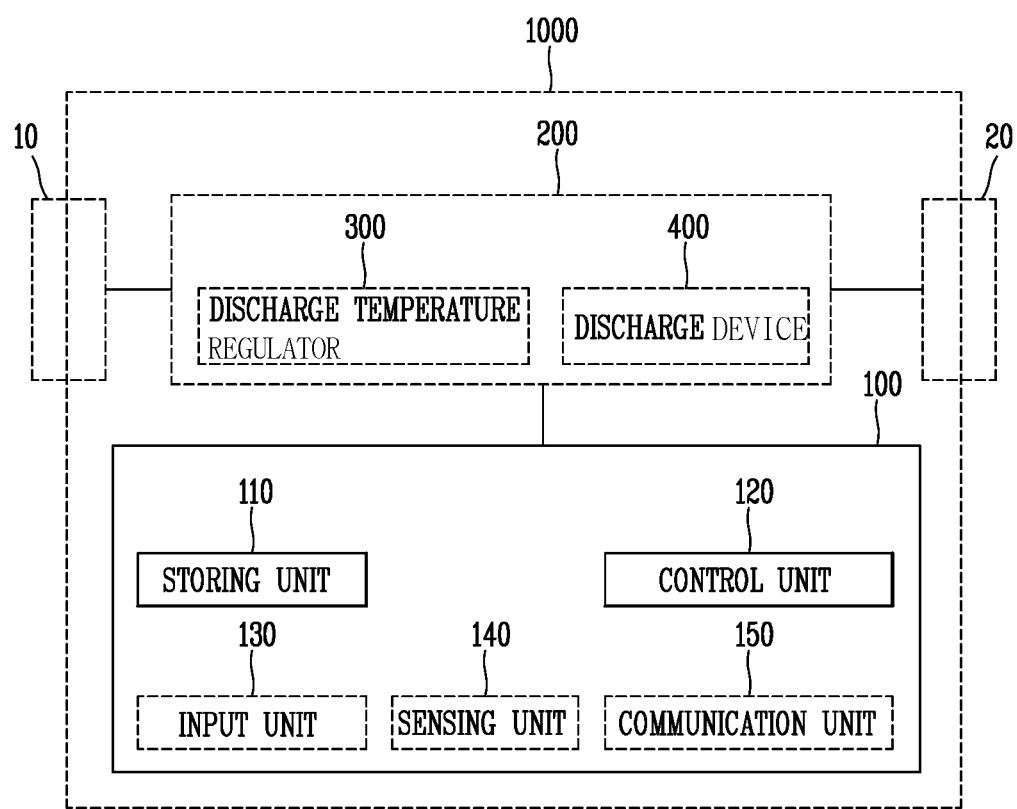
FIG. 2 is a block diagram illustrating configurations of an example control apparatus for a water purifier and an example water purifier including the example control apparatus.
Figure 3:
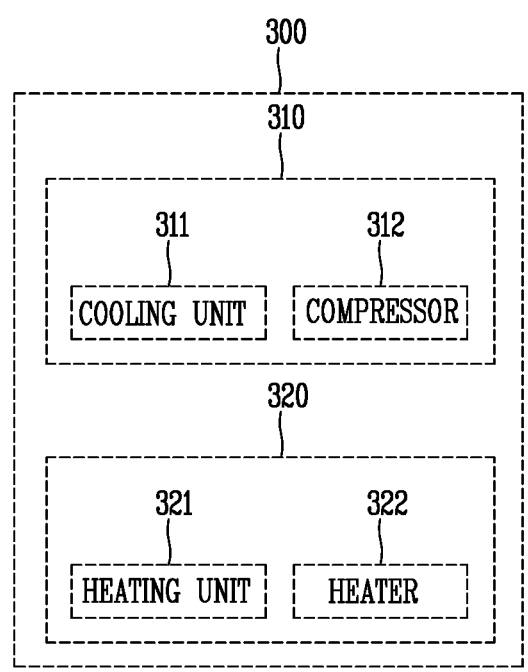
FIG. 3 is a block diagram illustrating a configuration of an example discharge temperature regulator.
Figures 6, 7:
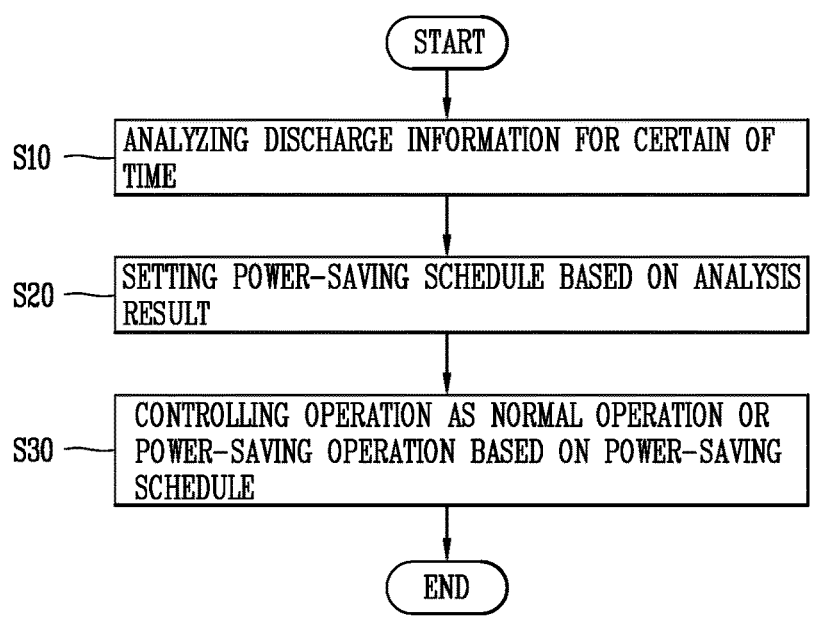
FIG. 6 is a view illustrating examples of a power-saving operation and a normal operation.
FIG. 7 is a flowchart showing example steps of an example control method for a water purifier.

An example control apparatus for a water purifier will be described with reference to FIGS. 1 to 6. FIG. 1 is a block diagram illustrating a configuration of the example control apparatus for the water purifier. FIG. 2 is a block diagram illustrating configurations of the control apparatus for the water purifier and the water purifier including the control apparatus. FIG. 3 is a block diagram illustrating a configuration of an example discharge temperature regulator. FIG. 4 is a first exemplary view illustrating examples of discharge information. FIG. 5 is a second exemplary view illustrating examples of discharge information. FIG. 6 is an exemplary view illustrating examples of the power-saving operation.

The control apparatus for the water purifier (hereinafter, "control apparatus") may be a control apparatus for a water purifier. The water purifier may indicate a water purifying apparatus that can discharge cold water or hot water. The control apparatus may be a control apparatus that can control an operation or action of the water purifier. For example, the control apparatus may be a main board of the water purifier, a microcomputer, or a central processing unit including the same. The control apparatus may include one or more modules that can control the operation of the water purifier or another apparatus including the same.

The control apparatus may control operations of the water purifier, such as regulating of a flow rate, cooling of cold water, heating of hot water, opening and closing of valves, filtering, and other operations of the water purifier. The control apparatus may be characterized by controlling the temperature of beverage discharged from the water purifier.

Referring to FIG. 1, a control apparatus 100 includes a storage device 110 and a control unit 120. Referring to FIG. 2, the control apparatus 100 including the storage device 110 and the control unit 120 is included in a water purifier 1000 to control the operation of the water purifier 1000.

With respect to the configuration of the water purifier 1000 including the control apparatus 100, the water purifier 1000 includes an inlet unit 10 into which clean water passing through a filter is introduced, an outlet unit 20 from which cold water or hot water is discharged to the outside, the control apparatus 100 that controls the operation of the water purifier 1000, and a discharge device 200 including a discharge temperature regulator 300 that regulates the temperature of cold water or hot water discharged from the outlet unit 20 and a discharge device 400 that discharges cool water or hot water to the outlet unit 20, wherein the discharge device 400 may include at least one of a filter, a flow valve that intermits a passage through which clean water is introduced or that regulates a flow rate, a hot water discharge valve that intermits a passage through which hot water is discharged, a steam valve that intermits a passage through which steam generated in the passage for hot water is discharged to the outside, and a flow sensor that senses an introduced flow.

The control apparatus 100 may control the operation of the above components of the water purifier 1000 to control the operation of the water purifier 1000.

The control apparatus 100 will now be described in detail, mainly based on the configurations and functions associated with the technology of the present disclosure, and the water purifier will be described later in more detail.

The storage device 110 of the control apparatus 100 stores discharge information for a certain period of time.

The storage device 110 may store, as data, discharge information of cold water or hot water discharged from the water purifier 1000 for the certain period of time.

The storage device 110 may store data processed in the control unit 120 or data regarding the operation of the water purifier 1000.

The storage device 110 may include a memory element that can store data regarding the operation and control of the control unit 120, such as EEPROM.

The control unit 120 of the control apparatus 100 sets a power-saving schedule based on the analysis result of the discharge information and controls the operation of the water purifier 1000 based on the power-saving schedule.

For example, the control unit 120 is a component that performs control functions of the control apparatus 100.

The control unit 120 may control the operation of the water purifier 1000 by analyzing the discharge information stored in the storage device 110, setting the power-saving schedule for the power-saving operation of the water purifier 1000 based on the analysis result, and controlling the components included in the water purifier 1000 based on the power-saving schedule.

A specific example of the control apparatus 100 including the storage device 110 that stores the discharge information for the certain period of time and the control unit 120 that sets the power-saving schedule based on the analysis result of the discharge information and controls the operation of the water purifier based on the power-saving schedule is as described below.

Here, the water purifier 1000 may be a tankless water purifier. For example, the control apparatus 100 may be a control apparatus for the tankless water purifier.

The tankless water purifier may indicate a water purifier that discharges cold water or hot water by cooling or heating water, unlike a tank type water purifier that discharges cold water or hot water stored in a tank.

For example, the control apparatus 100 may control the operation of the tankless water purifier that discharges cold water or hot water by cooling or heating water. The certain period of time may be at least two weeks. The certain period of time may be at least the past two weeks. For example, the storage device 110 may store the discharge information of the water purifier 1000 for at least the past two weeks. In some examples, the storage device 110 may store the discharge information for at least three weeks.

The discharge information may be information on a cumulative discharge amount by time slots on a daily basis. The discharge information may be information on a cumulative discharge amount of the beverage discharged from the water purifier 1000 by time slots on a daily basis. The discharge information may be divided into discharge information of cold water and discharge information of hot water.

For example, the discharge information may include information on a cumulative discharge amount of cold water discharged from the water purifier 1000 by time slots and information on a cumulative discharge amount of hot water discharged from the water purifier 1000 by time slots, respectively.

The discharge information may be stored in the storage device 110 as data in the form of a table.

The discharge information for the certain period of time stored in the storage device 110 is as shown in FIG. 4.

Referring to FIG. 4, the discharge information may represent a cumulative discharge amount by time slots (0 to 23) on a daily basis (first day, . . . ).

Here, t0 to t46 may indicate a cumulative discharge amount of the beverage discharged from the water purifier 1000 for one hour in each time slot.

As in the example of FIG. 4, the storage device 110 may store the discharge information for the certain period of time as data in the form of a table.

The control unit 120 may analyze the discharge information for the certain period of time stored in the storage device 110, set the power-saving schedule accordingly, and control the operation of the water purifier 1000 based on the power-saving schedule.

The power-saving schedule may be a schedule in which whether to perform the power-saving operation is set by time slots.

For example, the power-saving schedule may be an operation schedule of the water purifier 1000 by time slots in which the water purifier 1000 is set to perform the power-saving operation in the hours of x, y and z of the day.

The power-saving schedule may be an operation schedule by time slots on a daily basis.

The control unit 120 may analyze discharge information on the same days of the week for the certain period of time, determine the usage pattern by time slots of the corresponding days of the week, and set the power-saving schedule for the corresponding days of the week based on the usage pattern.

For example, the control unit 120 may determine the usage pattern by the days of the week and set the power-saving schedule.

The usage pattern may indicate a discharge pattern by time slots of the water purifier 1000.

The control unit 120 may compare a cumulative discharge amount by time slots of the same days of the week with a preset threshold discharge amount and determine the usage pattern.

For example, the control unit 120 may determine the usage pattern based on the cumulative discharge amount by time slots of the water purifier 1000.

For example, when the water purifier discharges 120 ml in one glass, if the cumulative discharge amount discharged from the water purifier for one hour is 600 ml, at least five glasses of beverage are discharged for the corresponding time, which leads to the determination that the using frequency is high in the corresponding time slot.

The preset threshold discharge amount, which is a discharge amount corresponding to the number of glasses of beverage discharged from the water purifier 1000, may indicate a criteria for determining the discharge frequency of the water purifier 1000.

For example, the preset threshold discharge amount may include criteria for determining the discharge frequency (using frequency) of the water purifier 1000.

For example, if the cumulative discharge amount is equal to or greater than the preset threshold discharge amount, the discharge frequency of the water purifier 1000 may be determined to be normal, and if the cumulative discharge amount is less than the preset threshold discharge amount, the discharge frequency of the water purifier 1000 may be determined to be not normal.

The preset threshold discharge amount may be differently set according to the water purifier 1000.

The preset threshold discharge amount may also be changed by the setting of the user.

The preset threshold discharge amount may be 360 ml which corresponds to at least three glasses of beverage.

The control unit 120 may determine a time slot during which the cumulative discharge amount is equal to or greater than the preset threshold discharge amount, among the time slots of the same days of the week, as a normal use time slot.

The control unit 120 may determine a time slot during which the cumulative discharge amount is less than the preset threshold discharge amount, among the time slots of the same days of the week, as a low-frequency use time slot.

For example, if the preset threshold discharge amount is 360 ml, the control unit 120 may determine the time slots during which the cumulative discharge amount is equal to or greater than 360 ml as the normal use time slots, while determining the time slots during which the cumulative discharge amount is less than 360 ml as the low-frequency use time slots.

The control unit 120 may determine a time slot during which the cumulative discharge amount is equal to or greater than the preset threshold discharge amount, among the time slots of the same days of the week, as a normal use time slot, the control unit 120 determining a time slot during which the normal use time slot is determined twice or more, as a normal operation time slot, and determining a time slot other than the normal operation time slot, as a power-saving operation time slot, to thereby determine the usage pattern.

Referring to FIG. 5, the control unit 120 may compare a cumulative discharge amount by time slots P1 of any one day of the week for three weeks with the preset threshold discharge amount, determine a time slot during which the cumulative discharge amount is equal to or greater than the preset threshold discharge amount as the normal use time slot 1, and determine a time slot during which the cumulative discharge amount is less than the preset threshold discharge amount as the low-frequency use time slot 0, the control unit 120 determining a time slot during which the normal use time slot 1 is determined twice or more, such as the hours of 0, 6, 7, 19, 20 and 23, as the normal operation time slot, and determining a time slot other than the normal operation time slot, such as the hours of 1 to 5, 8 to 18, 21 and 22, as the power-saving operation time slot, to thereby determine the usage pattern P2.

The control unit 120 may set the power-saving schedule based on the usage pattern.

The control unit 120 may set the power-saving schedule to perform the power-saving operation in the time slot determined as the power-saving operation time slot based on the usage pattern.

As in the above example, the control unit 120 may set the power-saving schedule to perform the power-saving operation in the time slots such as the hours of 1 to 5, 8 to 18, 21 and 22 determined as the power-saving operation time slots.

In addition, the control unit 120 may set the power-saving schedule to perform the normal operation in the time slots such as the hours of 0, 6, 7, 19, 20 and 23 determined as the normal operation time slots.

The control unit 120 may control the operation of the water purifier as the normal operation or the power-saving operation based on the power-saving schedule.

The control unit 120 may switch the operation of the water purifier into the normal operation or the power-saving operation based on the power-saving schedule, while controlling the operation of the water purifier 1000.

The control unit 120 may control the operation of the water purifier 1000 as the power-saving operation, if an operation time slot of the water purifier 1000 corresponds to a time slot set in the power-saving schedule.

The control unit 120 may control the operation of the water purifier 1000 so that the beverage can be discharged from the water purifier 1000, satisfying the preset discharge criteria, in the case of controlling the operation as the power-saving operation.

For example, the power-saving operation may indicate an operation in which the beverage is discharged from the water purifier 1000, satisfying the preset discharge criteria.

The preset discharge criteria may include criteria for a discharge amount of the beverage.

If the preset discharge criteria is the criteria for the discharge amount of the beverage, the power-saving operation may indicate an operation in which the beverage is discharged from the water purifier 1000 to a preset discharge amount.

If the preset discharge criteria is the criteria for the discharge amount of the beverage, the control unit 120 may control the operation of the water purifier 1000 so that the beverage can be discharged to the preset discharge amount, when controlling the operation as the power-saving operation.

For example, the control unit 120 may control the inlet unit 10, the discharge device 400 and the outlet unit 20 of the water purifier 1000 so that the beverage can be discharged from the water purifier 1000 to the preset discharge amount, as a result of which the water purifier 1000 may perform the power-saving operation so that the beverage can be discharged to the preset discharge amount.

For example, if the preset discharge criteria is the criteria for the discharge amount of the beverage, the water purifier 1000 may perform the power-saving operation so that the beverage can be discharged to the preset discharge amount.

The preset discharge amount may indicate a discharge amount requested by the user.

For example, the water purifier 1000 may perform the power-saving operation so that the beverage can be discharged to the preset discharge amount, as a result of which it is possible to satisfy the discharge amount requested by the user even in the power-saving operation.

The preset discharge amount may be differently set according to the water purifier 1000.

The preset discharge amount may also be changed by the setting of the user.

The preset discharge amount may be 600 ml which corresponds to at least five glasses of beverage, if the water purifier discharges 120 ml in one glass.

The preset discharge criteria may include criteria for a discharge temperature of the beverage.

If the preset discharge criteria is the criteria for the discharge temperature of the beverage, the power-saving operation may indicate an operation in which the beverage is discharged from the water purifier 1000 below a preset temperature.

In this case, the preset discharge criteria may include criteria for discharge of cold water.

If the preset discharge criteria is a criteria for discharge of hot water, the power-saving operation may indicate an operation in which the beverage is discharged from the water purifier 1000 over the preset temperature.

Here, for the purpose of description, it is presumed that the preset discharge criteria is the criteria for discharge of cold water.

If the preset discharge criteria is the criteria for a discharge temperature of the beverage, the control unit 120 may control the operation of the water purifier 1000 so that the beverage can be discharged below a preset temperature, when controlling the operation as the power-saving operation.

For example, the control unit 120 may control the inlet unit 10, the discharge device 400 and the outlet unit 20 of the water purifier 1000 so that the beverage can be discharged from the water purifier 1000 below the preset temperature, as a result of which the water purifier 1000 may perform the power-saving operation so that the beverage can be discharged below the preset temperature.

For example, if the preset discharge criteria is the criteria for the discharge temperature of the beverage, the water purifier 1000 may perform the power-saving operation so that the beverage can be discharged below the preset temperature.

The preset temperature may indicate a discharge temperature requested by the user.

For example, the water purifier 1000 may perform the power-saving operation so that the beverage can be discharged below the preset temperature, as a result of which it is possible to satisfy the discharge temperature requested by the user even in the power-saving operation.

The preset temperature may be differently set according to the water purifier 1000.

The preset temperature may also be changed by the setting of the user.

The preset temperature may be 8° C., if the water purifier discharges cold water at about 8° C.

The preset discharge criteria may also be a criteria for a discharge amount and temperature of the beverage.

If the preset discharge criteria is the criteria for the discharge amount and temperature of the beverage, the power-saving operation may indicate an operation in which the beverage can be discharged from the water purifier 1000 to a preset discharge amount and below a preset temperature.

If the preset discharge criteria is the criteria for the discharge amount and temperature of the beverage, the control unit 120 may control the operation of the water purifier 1000 so that the beverage can be discharged to the preset discharge amount and below the preset temperature, when controlling the operation as the power-saving operation.

For example, the control unit 120 may control the inlet unit 10, the discharge device 400 and the outlet unit 20 of the water purifier 1000 so that the beverage can be discharged from the water purifier 1000 to the preset discharge amount and below the preset temperature, as a result of which the water purifier 1000 may perform the power-saving operation so that the beverage can be discharged to the preset discharge amount and below the preset temperature.

For example, if the preset discharge criteria is the criteria for the discharge amount and temperature of the beverage, the water purifier 1000 may perform the power-saving operation so that the beverage can be discharged to the preset discharge amount and below the preset temperature.

The preset discharge amount and temperature may indicate a discharge amount and temperature requested by the user as discussed earlier.

For example, the water purifier 1000 may perform the power-saving operation so that the beverage can be discharged to the preset discharge amount and below the preset temperature, as a result of which it is possible to satisfy the discharge amount and temperature requested by the user even in the power-saving operation.

The control unit 120 may control the operation of the water purifier 1000 by regulating the temperature control range of the discharge temperature regulator 300 that regulates the temperature of the beverage discharged from the water purifier 1000, in the case of controlling the operation as the power-saving operation.

The discharge temperature regulator 300, which serves to regulate the temperature of cold water or hot water discharged from the water purifier 1000, may include at least one of a cooling device 310 that regulates the discharge temperature of cold water or the discharge temperature of hot water, as shown in FIG. 3.

For example, the power-saving operation may indicate an operation in which the temperature control range of the cooling device 310 or the heating device 320 that regulates the temperature of cold water or hot water discharged from the water purifier 1000 is regulated.

The discharge temperature regulator 300 may be the cooling device 310 that regulates the temperature of cold water discharged from the water purifier 1000, and the control unit 120 may control the operation of the water purifier 1000 by increasing the upper limit of the temperature control range set in the cooling device 310, in the case of controlling the operation as the power-saving operation.

Still referring to FIG. 3, the cooling device 310 may include a cooling unit 311 that cools cold water discharged from the water purifier 1000 and a compressor 312 that controls the temperature of the coolant stored in the cooling unit 311, in the case of which the temperature control range may be a temperature range of the coolant.

For example, the control unit 120 may control the operation of the water purifier 1000 by increasing the upper limit of the temperature control range for controlling the temperature of the coolant, in the case of controlling the operation as the power-saving operation.

For example, if the temperature control range of the coolant for controlling the temperature of cold water discharged from the water purifier 1000 to a temperature equal to or lower than 8° C. is comprised between 1.2° C. and 2.2° C., it is possible to control the operation of the water purifier 1000 by increasing the upper limit of the temperature control range from 2.2° C. to 4.2° C. in the power-saving operation.

For example, the temperature of the coolant stored in the cooling unit 311 is controlled between 1.2° C. and 2.2° C. in the normal operation, but it can be controlled between 1.2° C. and 4.2° C. in the power-saving operation, which makes it possible to reduce the total operation rate of the compressor 312 that controls the temperature of the coolant.

For example, more specifically, in the normal operation, if the temperature of the coolant becomes 2.2° C., the compressor 312 is driven to reduce the temperature of the coolant, and if the temperature of the coolant becomes 1.2° C., the compressor 312 stops to be driven, so that the temperature of the coolant is controlled and maintained between 1.2° C. and 2.2° C. On the contrary, in the power-saving operation, if the temperature of the coolant becomes 4.2° C., the compressor 312 is driven, and if the temperature of the coolant becomes 1.2° C., the compressor 312 stops to be driven, so that the temperature of the coolant is controlled and maintained between 1.2° C. and 4.2° C., as a result of which the operation rate of the compressor 312 and thus power consumption can be reduced.

This example is shown in the table of FIG. 6, which provides discharge temperature results of cool water of the water purifier 1000 according to the above control implementation.

Referring to FIG. 6, when the control unit 120 controls and maintains the temperature of the coolant between 1.2° C. and 4.2° C. in the power-saving operation, if the temperature of the coolant becomes 4.2° C. and the compressor 312 is driven (off→on), up to three glasses of cold water are discharged from the water purifier 1000 at a temperature equal to or lower than 8° C., and if the temperature of the coolant becomes 1.2° C. and the compressor 312 stops to be driven (on→off), up to five glasses of cold water are discharged from the water purifier 1000 at a temperature equal to or lower than 8° C., satisfying the discharge request of the user even in the power-saving operation, as a result of which it is possible to maintain usability/cool water discharge performance of the water purifier 1000 while reducing power consumption of the water purifier 1000.

In addition, the discharge temperature regulator 300 may be the heating device 320 that regulates the temperature of hot water discharged from the water purifier 1000, and the control unit 120 may control the operation of the water purifier 1000 by decreasing the lower limit of the temperature control range set in the heating device 320, in the case of controlling the operation as the power-saving operation.

Still referring to FIG. 3, the heating device 320 may include a heating unit 321 that heats hot water discharged from the water purifier 1000 and an induction heater 322 that controls the temperature of the heating unit 321, in the case of which the temperature control range may be a temperature range of the heating unit.

For example, the control unit 120 may control the operation of the water purifier 1000 by decreasing the lower limit of the temperature control range for controlling the temperature of the heating unit 321, in the case of controlling the operation as the power-saving operation.

In this case, similar to the control implementation of the cooling device 310 as described above, the lower limit of the temperature control range of the heating unit 321 is decreased and thus the operation rate of the induction heater 322 is reduced, which makes it possible to maintain usability/hot water discharge performance of the water purifier 1000 while reducing power consumption of the water purifier 1000.

The control unit 120 may switch the power-saving operation into the normal operation before a preset time, if the next time slot is a time slot corresponding to the normal operation, while controlling the operation as the power-saving operation.

This serves to stabilize the discharge temperature of cold water or hot water in advance, and the control unit 120 switches the power-saving operation into the normal operation before the preset time, if the next time slot is a time slot corresponding to the normal operation, which makes it possible to prepare for the normal operation.

The preset time may be 30 minutes.

The control unit 120 may switch the power-saving operation into the normal operation, if the beverage is discharged in excess of a preset discharge number of times, while controlling the operation as the power-saving operation.

This serves to switch the operation of the water purifier 1000 based on the discharge state, namely, to switch the power-saving operation into the normal operation based on the discharge state, if the set power-saving operation is not suitable due to the increased discharge number of times, which makes it possible to control the water purifier 1000 based on its using state.

The preset discharge number of times may be at least three glasses, or a discharge amount of 360 ml which corresponds to the at least three glasses.

The control unit 120 may update the power-saving schedule on a daily basis.

For example, the control unit 120 may update the power-saving schedule every day to perform the control operation suitable for the corresponding date.

Additionally, the control apparatus 100 may include the storage device 110 and the control unit 120 and may further include an input unit 130 to which processing commands for the operation of the water purifier 1000 are input, as shown in FIG. 2.

The control unit 120 may control the operation of the water purifier 1000 according to the processing commands input to the input unit 130.

The processing commands for the operation of the water purifier 1000 may be input from the outside of the control apparatus 100 to the input unit 130.

For example, commands such as discharge of cold water or hot water, cooling of cold water, or heating of hot water may be input according to the user's manipulation to the water purifier 1000.

A sensing signal or control signal may also be input from a sensor provided in the water purifier 1000 or another module to the input unit 130.

The processing commands input to the input unit 130 may be transferred to the control unit 120.

The control unit 120 may control the operation of the water purifier 1000 according to the processing commands transferred from the input unit 130.

The control apparatus 100 may further include at least one of a sensing unit 140 that can sense one or more state values of the water purifier 1000 through one or more sensors provided in the water purifier 1000 and a communication unit 150 that communicates with external devices.

The sensing unit 140 may include a temperature sensor that senses one or more state values of the water purifier 1000 or senses the temperature of the control unit 120 itself.

The communication unit 150 may be a communication module that communicates with external user terminals or other home appliances.

The input unit 130, the sensing unit 140 and the communication unit 150 assist the control operation of the control unit 120, and the control apparatus 100 may further include components associated with the control operation of the control unit 120, other than the above components or similar components.

Hereinafter, the water purifier will be described only based on its implementation, without repeating the contents described above with respect to the control apparatus.

The water purifier 1000 may be the water purifier 1000 as described above.

The water purifier 1000 may include the control apparatus 100 as described above.

Referring to FIG. 2, the water purifier 1000 includes an inlet unit 10 into which clean water passing through a filter is introduced, an outlet unit 20 from which cold water or hot water is discharged to the outside, a discharge temperature regulator 300 that regulates the temperature of cold water or hot water discharged from the outlet unit 20, and a control apparatus 100 that controls the outlet unit 20 and the discharge temperature regulator 300 to control the operation of the water purifier 1000, the control apparatus 100 storing discharge information for a certain period of time, setting a power-saving schedule based on the analysis result of the discharge information, and controlling the operation of the water purifier 1000 as the normal operation or the power-saving operation based on the power-saving schedule.

Also, the water purifier 1000 may further include a discharge device 400 that discharges cool water or hot water to the outlet unit 20, wherein the discharge device 400 may include at least one of a filter, a flow valve that intermits a passage through which clean water is introduced or that regulates a flow rate, a hot water discharge valve that intermits a passage through which hot water is discharged, a steam valve that intermits a passage through which steam generated in the passage for hot water is discharged to the outside, and a flow sensor that senses an introduced flow.

The water purifier 1000 may be a tankless water purifier.

The certain period of time may be at least two weeks.

The discharge information may be information on a cumulative discharge amount by time slots on a daily basis.

The power-saving schedule may be a schedule in which whether to perform the power-saving operation is set by time slots.

The control apparatus 100 may analyze discharge information on the same days of the week for the certain period of time, determine the usage pattern by time slots of the corresponding days of the week, and set a power-saving schedule for the corresponding days of the week based on the usage pattern.

The control apparatus 100 may compare a cumulative discharge amount by time slots of the same days of the week with a preset threshold discharge amount and determine the usage pattern.

The control apparatus 100 may determine a time slot during which the cumulative discharge amount is equal to or greater than the preset threshold discharge amount, among the time slots of the same days of the week, as a normal use time slot, the control apparatus 100 determining a time slot during which the normal use time slot is determined twice or more, as a normal operation time slot, and determining a time slot other than the normal operation time slot, as a power-saving operation time slot, to thereby determine the usage pattern.

The control apparatus 100 may set the power-saving schedule to perform the power-saving operation in the time slot determined as the power-saving operation time slot.

The control apparatus 100 may control the operation of the water purifier 1000 as the power-saving operation, if an operation time slot of the water purifier 1000 corresponds to a time slot set in the power-saving schedule.

The power-saving operation may be an operation in which the beverage is discharged from the water purifier 1000, satisfying the preset discharge criteria.

For example, the water purifier 1000 may perform the power-saving operation so that the beverage can be discharged satisfying the preset discharge criteria.

It can be accomplished by the control apparatus 100 controlling the discharge temperature regulator 300 or the discharge device 400, which is included in the water purifier 1000, so that the beverage can be discharged satisfying the preset discharge criteria.

The preset discharge criteria may include criteria for a discharge amount of the beverage, and the power-saving operation may be an operation in which the beverage is discharged to a preset discharge amount.

For example, the water purifier 1000 may perform the power-saving operation so that the beverage can be discharged to the preset discharge amount.

The preset discharge criteria may include criteria for a discharge temperature of the beverage, and the power-saving operation may be an operation in which the beverage is discharged below a preset temperature.

For example, the water purifier 1000 may perform the power-saving operation so that the beverage can be discharged below the preset temperature.

The preset discharge criteria may include criteria for a discharge amount and temperature of the beverage, and the power-saving operation may be an operation in which the beverage is discharged to a preset discharge amount and below a preset temperature.

For example, the water purifier 1000 may perform the power-saving operation so that the beverage can be discharged to the preset discharge amount and below the preset temperature.

The power-saving operation may also be an operation in which the temperature control range of the discharge temperature regulator 300 is regulated.

For example, the water purifier 1000 may perform the power-saving operation so that the temperature control range of the discharge temperature regulator 300 can be regulated.

It can be accomplished by the control apparatus 100 controlling the temperature control range of the discharge temperature regulator 300, so that the beverage can be discharged satisfying the preset discharge criteria.

Referring to FIG. 3, the discharge temperature regulator 300 may be a cooling device 310 that regulates the temperature of cold water discharged from the water purifier 1000, or a heating device 320 that regulates the temperature of hot water discharged from the water purifier 1000.

For example, the water purifier 1000 may perform the power-saving operation so that the temperature control range of the cooling device 310 or the heating device 320 can be regulated.

The power-saving operation may be an operation in which the upper limit of the temperature control range set in the cooling device 310 is increased, if the discharge temperature regulator 300 is the cooling device 310.

The cooling device 310 may include a cooling unit 311 that cools cold water discharged from the water purifier 1000 and a compressor 312 that controls the temperature of the coolant stored in the cooling unit 311, the temperature control range being a temperature range of the coolant.

For example, the water purifier 1000 may perform the power-saving operation so that the upper limit of the temperature control range for controlling the temperature of the coolant can be increased.

As the upper limit of the temperature control range for controlling the temperature of the coolant is increased in the power-saving operation, the operation rate of the compressor 312 can be reduced, as a result of which power consumption of the water purifier 1000 can be reduced.

For example, if the temperature control range of the coolant for controlling the temperature of cold water discharged from the water purifier 1000 to a temperature equal to or lower than 8° C. is comprised between 1.2° C. and 2.2° C., it is possible to perform the power-saving operation by increasing the upper limit of the temperature control range from 2.2° C. to 4.2° C.

The power-saving operation may be an operation in which the lower limit of the temperature control range set in the heating device 320 is decreased, if the discharge temperature regulator 300 is the heating device 320.

The heating device 320 may include a heating unit 321 that heats hot water discharged from the water purifier 1000 and an induction heater 322 that controls the temperature of the heating unit 321, the temperature control range being a temperature range of the heating unit 321.

For example, the water purifier 1000 may perform the power-saving operation so that the lower limit of the temperature control range for controlling the temperature of the heating unit 321 can be decreased.

As the lower limit of the temperature control range for controlling the temperature of the heating unit 321 is decreased in the power-saving operation, the operation rate of the induction heater 322 can be reduced, as a result of which power consumption of the water purifier 1000 can be reduced.

The water purifier 1000 may switch the power-saving operation into the normal operation before a preset time, if the next time slot is a time slot corresponding to the normal operation, while performing the power-saving operation.

This serves to stabilize the discharge temperature of cold water or hot water in advance, and the water purifier 1000 switches the power-saving operation into the normal operation before the preset time, if the next time slot is a time slot corresponding to the normal operation, which makes it possible to prepare for the normal operation.

The water purifier 1000 may switch the power-saving operation into the normal operation, if the beverage is discharged in excess of a preset discharge number of times, while performing the power-saving operation.

This serves to switch the operation of the water purifier 1000 based on the discharge state, namely, to switch the power-saving operation into the normal operation based on the discharge state, if the set power-saving operation is not suitable due to the increased discharge number of times, which makes it possible to control the water purifier 1000 based on its using state.

The water purifier 1000 may update the power-saving schedule on a daily basis to perform the operation.

For example, the water purifier 1000 may update the power-saving schedule every day to perform the operation suitable for the corresponding date.

A control method for a water purifier (hereinafter, "control method") will now be described with reference to FIG. 7 only based on its implementation, without repeating the contents described above with respect to the control apparatus and the water purifier.

FIG. 7 is a flowchart showing sequential steps of the control method for the water purifier.

The control method may be a control method for controlling the operation of a tankless water purifier.

The control method may be a control method for the control apparatus 100 and the water purifier 1000 described above.

Referring to FIG. 7, the control method includes analyzing discharge information for a certain period of time (S10), setting a power-saving schedule based on the analysis result (S20), and controlling the operation of the water purifier as the normal operation or the power-saving operation based on the power-saving schedule (S30).

The certain period of time may be at least the past two weeks.

The discharge information may be information on a cumulative discharge amount by time slots on a daily basis.

As shown in FIG. 4, the discharge information may represent a cumulative discharge amount by time slots (0 to 23) on a daily basis (e.g., first day, second day, third day, . . . ).

The power-saving schedule may be a schedule in which whether to perform the power-saving operation is set by time slots.

For example, the power-saving schedule may be an operation schedule of the water purifier 1000 by time slots in which the water purifier 1000 is set to perform the power-saving operation in the periods of time of x, y and z of the day.

The power-saving schedule may be an operation schedule by time slots on a daily basis.

The analyzing step (S10) may analyze discharge information on the same days of the week for the certain period of time and determine the usage pattern of the corresponding days of the week by time slots.

For example, the analyzing step (S10) may determine the usage pattern by the days of the week.

The usage pattern may indicate a discharge pattern by time slots of the water purifier 1000.

The analyzing step (S10) may compare a cumulative discharge amount by time slots of the same days of the week with a preset threshold discharge amount and determine the usage pattern.

For example, when the water purifier discharges 120 ml in one glass, if the cumulative discharge amount discharged from the water purifier for one hour is 600 ml, at least five glasses of beverage are discharged for the corresponding time, which leads to the determination that the using frequency is high in the corresponding time slot.

The preset threshold discharge amount, which is a discharge amount corresponding to the number of glasses of beverage discharged from the water purifier 1000, may indicate a criteria for determining the discharge frequency of the water purifier 1000.

The analyzing step (S10) may determine a time slot during which the cumulative discharge amount is equal to or greater than the preset threshold discharge amount, among the time slots of the same days of the week, as a normal use time slot.

The analyzing step (S10) may determine a time slot during which the cumulative discharge amount is less than the preset threshold discharge amount, among the time slots of the same days of the week, as a low-frequency use time slot.

The analyzing step (S10) may determine a time slot during which the cumulative discharge amount is equal to or greater than the preset threshold discharge amount, among the time slots of the same days of the week, as the normal use time slot, the analyzing step (S10) determining a time slot during which the normal use time slot is determined twice or more, as a normal operation time slot, and determining a time slot other than the normal operation time slot as a power-saving operation time slot to thereby determine the usage pattern.

The setting step (S20) may set the power-saving schedule based on the usage pattern determined by the analysis of the discharge information.

The setting step (S20) may set the power-saving schedule to perform the power-saving operation in a time slot determined as the power-saving operation time slot based on the usage pattern.

The controlling step (S30) may control the operation of the water purifier 1000 as the normal operation or the power-saving operation based on the power-saving schedule.

The controlling step (S30) may switch the operation of the water purifier 1000 into the normal operation or the power-saving operation based on the power-saving schedule, while controlling the operation of the water purifier 1000.

The controlling step (S30) may control the operation of the water purifier 1000 as the power-saving operation, if an operation time slot of the water purifier 1000 corresponds to a time slot set in the power-saving schedule.

The controlling step (S30) may control the operation of the water purifier 1000 so that the beverage can be discharged from the water purifier 1000, satisfying the preset discharge criteria, in the case of controlling the operation as the power-saving operation.

The preset discharge criteria may include criteria for a discharge amount of the beverage.

If the preset discharge criteria is the criteria for the discharge amount of the beverage, the controlling step (S30) may control the operation of the water purifier 1000 so that the beverage can be discharged to a preset discharge amount, in the case of controlling the operation as the power-saving operation.

The preset discharge criteria may include criteria for a discharge temperature of the beverage.

If the preset discharge criteria is the criteria for the discharge temperature of the beverage, the controlling step (S30) may control the operation of the water purifier 1000 so that the beverage can be discharged below a preset temperature, in the case of controlling the operation as the power-saving operation.

The preset discharge criteria may include criteria for a discharge amount and temperature of the beverage.

If the preset discharge criteria is the criteria for the discharge amount and temperature of the beverage, the controlling step (S30) may control the operation of the water purifier 1000 so that the beverage can be discharged to a preset discharge amount and below a preset temperature, in the case of controlling the operation as the power-saving operation.

The controlling step (S30) may control the operation of the water purifier 1000 by regulating a temperature control range of a discharge temperature regulator 300 that regulates the temperature of the beverage discharged from the water purifier 1000, in the case of controlling the operation as the power-saving operation.

The discharge temperature regulator 300, which serves to regulate the temperature of cold water or hot water discharged from the water purifier 1000, may include at least one of a cooling device 310 that regulates the discharge temperature of cold water or the discharge temperature of hot water, as shown in FIG. 3.

The controlling step (S30) may control the operation of the water purifier 1000 by increasing the upper limit of the temperature control range set in the cooling device 310, in the case of controlling the operation as the power-saving operation.

Referring to FIG. 3, the cooling device 310 may include a cooling unit 311 that cools cold water discharged from the water purifier 1000 and a compressor 312 that controls the temperature of the coolant stored in the cooling unit 311, in the case of which the temperature control range may be a temperature range of the coolant.

For example, the controlling step (S30) may control the operation of the water purifier 1000 by increasing the upper limit of the temperature control range for controlling the temperature of the coolant, in the case of controlling the operation as the power-saving operation.

In addition, the controlling step (S30) may control the operation of the water purifier 1000 by decreasing the lower limit of the temperature control range set in the heating device 320, in the case of controlling the operation as the power-saving operation.

Still referring to FIG. 3, the heating device 320 may include a heating unit 321 that heats hot water discharged from the water purifier 1000 and an induction heater 322 that controls the temperature of the heating unit 321, in the case of which the temperature control range may be a temperature range of the heating unit.

For example, the controlling step (S30) may control the operation of the water purifier 1000 by decreasing the lower limit of the temperature control range for controlling the temperature of the heating unit 321, in the case of controlling the operation as the power-saving operation.

The controlling step (S30) may switch the power-saving operation into the normal operation before a preset time, if the next time slot is a time slot corresponding to the normal operation, while controlling the operation as the power-saving operation.

The controlling step (S30) may switch the power-saving operation into the normal operation, if the beverage is discharged in excess of a preset discharge number of times, while controlling the operation as the power-saving operation.

Moreover, the control method may update the power-saving schedule on a daily basis.

For example, the control method may update the power-saving schedule every day to perform the control operation suitable for the corresponding date.

The control method as described above may be applied as control algorithms and programs including applications, software, etc., of the control apparatus 100 or the control unit 120 included in the control apparatus 100, for controlling the water purifier 1000.

The control apparatus for the water purifier, the water purifier, and the control method for the water purifier have the effects of more precisely analyzing and applying the usage pattern to perform the optimal power-saving operation, through the above-described implementations.

In addition, the control apparatus for the water purifier, the water purifier, and the control method for the water purifier have the effects of more precisely analyzing and applying the usage pattern to perform the power-saving operation, through the above-described implementations, to thereby maintain discharge performance or usability, while reducing power consumption in the power-saving operation, compared to the normal operation.

Moreover, the control apparatus for the water purifier, the water purifier, and the control method for the water purifier have the effects of precisely regulating the temperature control range of the discharge temperature regulator in the power-saving operation, through the above-described implementations, to thereby appropriately reduce power consumption.

Furthermore, the control apparatus for the water purifier, the water purifier, and the control method for the water purifier have the effects of adequately and efficiently performing the operation of the water purifier, and at the same time, improving usability, utility and applicability of the technology for controlling the water purifier, through the above-described implementations, in addition to the foregoing effects.

While the disclosure has been shown and described with respect to the example implementations, it will be understood by those skilled in the art that various changes and modifications may be made without departing from the spirit and scope of the disclosure as defined in the following claims.

What is claimed is:

1. A control apparatus comprising:
   a storage device configured to store discharge information that includes a cumulative discharge amount of beverage discharged from a water purifier in a time slot among a predetermined plurality of time slots of a day; and
   a control unit configured to:
      analyze the discharge information,
      based on analysis of the discharge information, set the time slot in a power-saving schedule that includes information about whether to perform a power-saving operation at one or more time slots among the predetermined plurality of time slots, and
      based on determining that an operation time is within the time slot set in the power-saving schedule, control the water purifier to perform the power-saving operation,
   wherein the discharge information further includes a plurality of cumulative discharge amounts of beverage discharged from the water purifier during the predetermined plurality of times slots, respectively, in certain days of at least two weeks,
   wherein the control unit is further configured to:
      based on the discharge information, determine a usage pattern by the time slot,
      based on the usage pattern, set the time slot of the certain days in the power-saving schedule,
      compare the cumulative discharge amount of beverage discharged in the time slot with a threshold discharge amount,
      determine that the cumulative discharge amount of beverage discharged in the time slot is greater than or equal to the threshold discharge amount,
      based on determining that the cumulative discharge amount of beverage discharged in the time slot is greater than or equal to the threshold discharge amount, determine the time slot as a normal use time slot,
      count the normal use time slot in the certain days of at least two weeks,
      based on a number of normal use time slots being two or more, set the time slot to a normal operation time slot in the usage pattern, and
      based on the number of normal use time slots being less than two, set the time slot to a power-saving operation time slot in the usage pattern.

2. The control apparatus of claim 1, wherein the control unit is further configured to, based on the water purifier performing the power-saving operation, control the water purifier to discharge to discharge the beverage based on preset discharge criteria.

3. The control apparatus of claim 2, wherein the preset discharge criteria include a preset discharge amount of the beverage, and
   wherein the control unit is further configured to, based on the water purifier performing the power-saving operation, control the water purifier to discharge the beverage to the preset discharge amount.

4. The control apparatus of claim 2, wherein the preset discharge criteria include a preset discharge temperature, and
   wherein the control unit is further configured to, based on the water purifier performing the power-saving operation, control the water purifier to discharge the beverage at a temperature less than the preset discharge temperature.

5. The control apparatus of claim 2, wherein the preset discharge criteria include a preset discharge amount of the beverage and a preset discharge temperature, and
   wherein the control unit is further configured to, based on the water purifier performing the power-saving operation, control the water purifier to discharge the beverage to the preset discharge amount at a temperature less than the preset discharge temperature.

6. The control apparatus of claim 1, wherein the water purifier includes a discharge temperature regulator that is configured to regulate a temperature of the beverage, and
   wherein the control unit is further configured to, based on the water purifier performing the power-saving operation, control the water purifier by regulating a temperature control range.

7. The control apparatus of claim 6, wherein the discharge temperature regulator includes a cooling device that is configured to regulate a temperature of cold water that is to be discharged from the water purifier, and
   wherein the control unit is further configured to, based on the water purifier performing the power-saving operation, increase an upper limit of the temperature control range.

8. The control apparatus of claim 7, wherein the cooling device comprises:
   a cooling unit including coolant and being configured to cool the cold water; and
   a compressor configured to control a temperature of the coolant, and
   wherein the temperature control range is a temperature range of the coolant.

9. The control apparatus of claim 1, wherein the control unit is further configured to:
   based on the time slot having been set to the power-saving operation, determine that the time slot is followed by a second time slot that is set to a normal operation; and
   based on determining that the time slot is followed by the second time slot that is set to the normal operation, control the water purifier to switch from the power-saving operation to the normal operation at a preset time before the second time slot.

10. The control apparatus of claim 1, wherein the control unit is further configured to, based on the water purifier performing the power-saving operation:

determine a number of times that the beverage has been discharged in the time slot; and based on the number of times exceeding a threshold number of times, control the water purifier to switch the power-saving operation to a normal operation.

11. A control method for a water purifier that is configured to discharge beverage, the water purifier including a cooling device that is configured to regulate a temperature of the beverage, the control method comprising:

analyzing discharge information that includes a cumulative discharge amount of the beverage discharged from the water purifier in a time slot among a predetermined plurality of time slots of a day;

based on analysis of the discharge information, setting the time slot in a power-saving schedule that includes information about whether to perform a power-saving operation at one or more time slots among the predetermined plurality of time slots; and based on the power-saving schedule, controlling the water purifier to perform a normal operation or the power-saving operation, wherein controlling the water purifier to perform the power-saving operation includes at least one of controlling the water purifier to discharge the beverage based on preset discharge criteria or controlling the water purifier by increasing an upper limit of a temperature control range of the cooling device, wherein the discharge information further includes a plurality of cumulative discharge amounts of the beverage discharged from the from the water purifier during the predetermined plurality of time slots, respectively, in certain days of at least two weeks, wherein analyzing the discharge information comprises determining a usage pattern by the time slot based on the discharge information, wherein setting the time slot in the power-saving schedule comprises setting the time slot of the certain days in the power-saving schedule based on the usage pattern, and wherein determining the usage pattern comprises:

comparing the cumulative discharge amount of the beverage discharged in the time slot with a threshold discharge amount, determining that the cumulative discharge amount of the beverage discharged in the time slot is greater than or equal to the threshold discharge amount, determining the time slot as a normal use time slot based on determining that the cumulative discharge amount of the beverage discharged in the time slot is greater than or equal to the threshold discharge amount, counting the normal use time slot in the certain days of at least two weeks, setting the time slot to a normal operation time slot in the usage pattern based on a number of normal use time slots being two or more, and setting the time slot to a power-saving operation time slot in the usage pattern based on the number of normal use time slots being less than two.

12. The control apparatus of claim 1, wherein each of the predetermined plurality of time slots corresponds to one hour.

13. The control apparatus of claim 1, wherein the power-saving schedule is set before the operation time.

14. The control apparatus of claim 1, wherein the power-saving schedule includes:

one or more first time slots, among the predetermined plurality of time slots, that are set to perform the power-saving operation; and one or more second time slots, among the predetermined plurality of time slots, that are set to not perform the power-saving operation.

15. The control apparatus of claim 1, wherein the power-saving schedule includes 24 time slots, each of the 24 time slots corresponding to one hour.

* * * * *